March 14, 1967
J. H. BERTIN ET AL
3,308,806
DEVICE FOR CLEARING WIDE SNOW-OR ICE-COVERED
RUNWAYS, ROADS OR THE LIKE
Filed Oct. 20, 1965
2 Sheets-Sheet 1
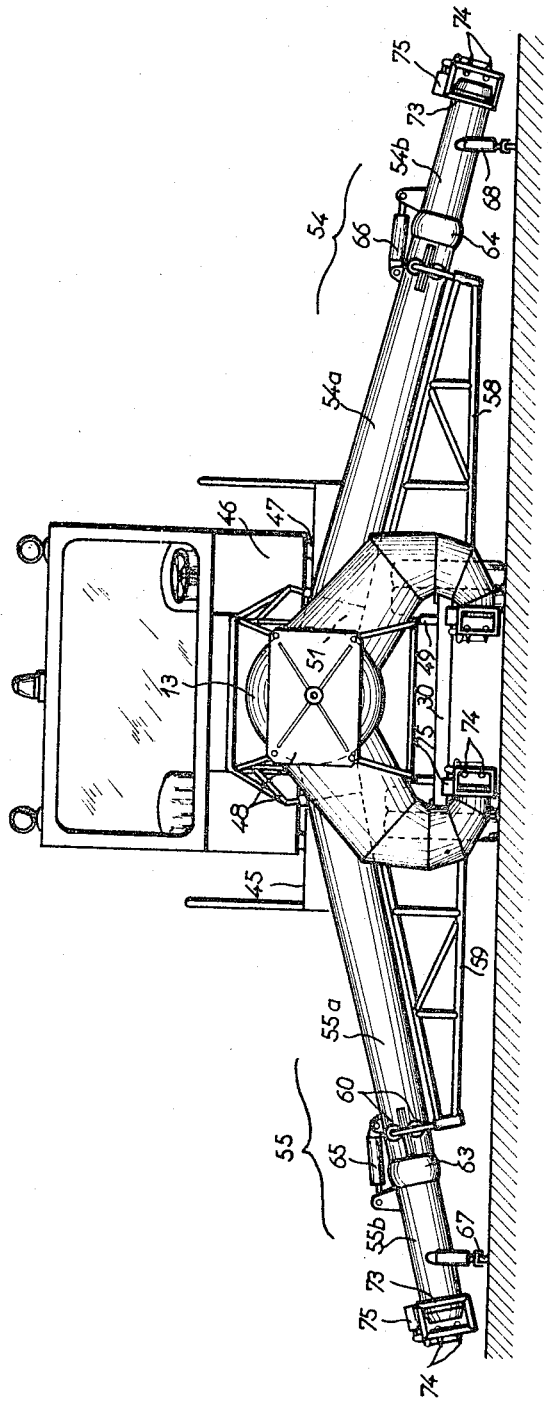
Fig.:1
Inventors
Jean H. Bertin
Ernest Dubois
By Stevens, Davis, Miller & Mosher
Attorneys March 14, 1967
J. H. BERTIN ET AL  3,308,806
DEVICE FOR CLEARING WIDE SNOW-OR ICE-COVERED
RUNWAYS, ROADS OR THE LIKE
Filed Oct. 20, 1965
2 Sheets-Sheet 2
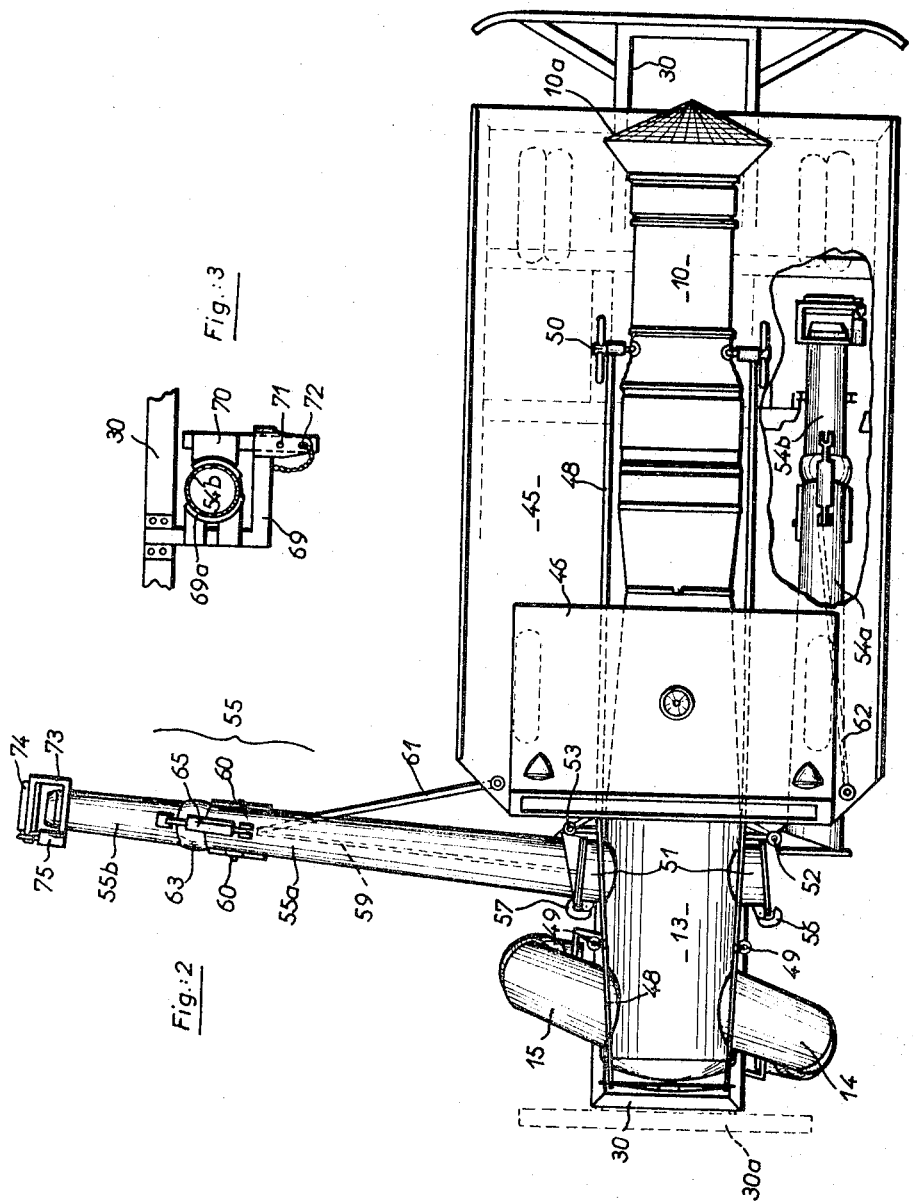
Inventors
Jean H. Bertin
Ernest Dubois
By Stevens, Davis, Miller & Mosher
Attorneys

# United States Patent Office 3,308,806
Patented Mar. 14, 1967

3,308,806
DEVICE FOR CLEARING WIDE SNOW- OR ICE-COVERED RUNWAYS, ROADS OR THE LIKE
Jean H. Bertin, Neuilly-sur-Seine, and Ernest Dubois, Fontenay-aux-Roses, France, assignors to Bertin & Cie, Paris, France, a company of France
Filed Oct. 20, 1965, Ser. No. 498,453
Claims priority, application France, Jan. 27, 1965, 3,477
7 Claims. (Cl. 126—271.2)

United States patent specification 3,199,506 describes an apparatus which is mounted on the front of a vehicle and which comprises two curved ducts supplied by a turbo-jet with hot gases, the duct discharge orifices being near the ground and slightly staggered in the longitudinal direction which is the direction of vehicle movement, the axes of such orifices extending substantially horizontally and transversely, the orifices having provision for deflecting the jet stream.

With a turbo-jet developing from 2800 to 3000 kg. weight of static thrust, this apparatus has shown itself capable of removing nearly all the glazed frost in a single pass over a width of about 25 metres—i.e., 12 to 13 metres beyond the discharge orifice of each curved duct. A track covered just by snow is cleaned over an even greater width in a single pass.

The experiments have shown that the deflecting system in the discharge orifices can readily be used just in the vertical direction. A number of flaps immersed in the hot stream issuing from an orifice, the flaps being made of a heat-resistant material and each being pivotable around a horizontal pivot by a control jack, form a simple and effective embodiment of a mechanical deflecting system of this kind.

Clearly also, it is preferable to clean a very wide area at each pass even at the cost of slowing down the carrier vehicle. The transverse arrangement of the hot gas discharge orifices means that there is some risk of debris collecting in a place which has already been cleaned when a nearby area is being cleaned; however, as will be seen hereinafter, this arrangement can readily be used to extend the range of the apparatus.

According to this invention, the exhaust pipe following the turbo-jet and extending substantially horizontally towards the vehicle front branches not only into two curved ducts as set forth in United States patent specification No. 3,199,506 but also into a pair of straight auxiliary discharge ducts disposed completely or substantially transversely slightly behind the curved ducts. The orifices of the auxiliary ducts are near the ground and the hot streams at high speed issuing from them prolong the action of the streams delivered by the curved ducts.

In one advantageous form of the invention, the auxiliary ducts can be folded back on to the carrier vehicle sides. The auxiliary ducts comprise a first portion borne by a pivoting arm rigidly connected to a cradle for receiving the turbo-jet and its nozzle on the vehicle, and an end portion which is overhung on the end of the first portion and connected thereto by an articulation, such as a toggle joint or the like, whose axis is horizontal, and a jack controlled by a feeler which an end portion has near its orifice maintains the same at a constant distance above the ground.

The orifices of the curved ducts and the orifices of the straight auxiliary ducts each have stream-deflecting flaps disposed on horizontal pivots and operated by a double-acting jack. Rollers or slideways are interposed between the end of the pivoting arms each supporting an auxiliary duct, and the corresponding duct, to permit free expansion thereof.

For a better understanding of the invention and to show how the same may be carried into effect, reference may now be made to the accompanying drawings wherein:

FIG. 1 is an end elevation of a track-clearing vehicle according to the invention, the auxiliary ducts being shown in the operative position;

FIG. 2 is a plan view corresponding to FIG. 1, with partial sectioning to show the left-hand auxiliary duct in the folded position, and FIG. 3 diagrammatically shows means for supporting the end of an auxiliary duct in the folded position.

The carrier vehicle, which can be of substantially conventional construction, has as its main items a frame 30 on which a turbo-jet 10 and, disposed therearound, a platform 45 are mounted. A control cab 46 is disposed above and to the front of the platform 45 and is connected thereto by some known form of resilient suspension 47. The turbo-jet 10 includes an air intake 10a opening towards the rear of the vehicle, an air compressor, combustion chambers and a gas turbine for driving the air compressor. The exhaust gases issuing from the turbine are collected in a tubular chamber 13 extending the turbo-jet towards the front of the vehicle. The common axis of the turbo-jet and of the tubular chamber 13 is substantially horizontal. The cab 46 straddles the chamber 13 and contains seats for the vehicle driver and for the operator of the heat cleaning apparatus according to this invention. No further details of the carrier vehicle will be given and it will be assumed to have in conventional manner rear driving wheels driven by a motor suspended below the frame 30 and front steerable wheels.

The tubular chamber 13 and the turbo-jet 10 are mounted in a cradle 48. The same is borne by the frame by a horizontal pivot 50 at the rear and at the front by jacks 49 adapted to rotate the cradle around the pivots in a vertical plane. As in the aforesaid United States patent specification, the chamber 13 bears two curved ducts 14 and 15 whose discharge orifices are near the ground and extend transversely and are staggered in the longitudinal direction corresponding to the direction of vehicle movement. Consequently, varying the length of the jacks 49 varies the above-ground height of the latter orifices.

Behind the curved ducts the chamber 13 has two transverse and oppositely disposed spigots 51 which are connected to straight auxiliary ducts 54 and 55. Each auxiliary duct is connected by means of an articulation 52 and 53 whose axis is substantially vertical and which is, with advantage, borne by the cradle 48. Preferably, a mechanical lock means 56 and 57 is disposed opposite each articulation 52 and 53 in front of a connection 51.

The ducts 54 and 55, like the curved ducts 14 and 15, have a convergent form in the direction of flow of the hot gases issuing from the chamber 13 so as to expand said gases and to form gaseous jets at high kinetic and thermal energy.

The cradle 48 also bears two arms 58 and 59 each articulated around a vertical hinge which, with advantage, coincides with the corresponding pivot spindle 52 and 53 and which serves to bear a duct 54 and 55. Rollers 60 are disposed at the end of each arm 58 and 59 and are preferably mounted on a fork having a vertical pivot. The rollers co-operate with a double ramp of a first portion 54a and 55a of the ducts 54 and 55 so as to bear the same while allowing them free heat expansion movements. A stay 61 and 62 can be used to increase the horizontal rigidity of each of the systems formed by an auxiliary duct and its support arm.

A toggle joint 63 and 64 or some similar form of joint adapted to pivot around a horizontal spindle is disposed at the end of the first portion 54a and 55a of such a duct.

The toggle joint acts as an articulation for an end portion 54b and 55b of each straight auxiliary duct. The end portion, being pivotable by a jack 65 and 66 in a substantially vertical plane and under the control of a feeler 67 and 68 borne by each end portion 54b and 55b, will ensure that the orifice of an auxiliary discharge duct 54 and 55 is maintained at a constant height above ground level. The feeler can take the form, for instance, of a roller mounted on the end of a distributor valve through which the corresponding jack 65 and 66 is supplied.

When a duct of this kind is folded (e.g. 54 in FIGS. 2 and 3), its end portion 54b rests on a support rigidly connected to the carrier vehicle frame 30 and comprising, for instance, a stationary jaw 69 having bearing fuse 69a, and a jaw 70 movable around a spindle 71, the system being readily lockable by a pin 72. With the two auxiliary ducts folded, the vehicle has a reduced width possibly less than the railway loading gauge.

The orifices of the ducts 14, 15, 54 and 55 all have a frame 73 bearing a number of flaps 74 mounted on horizontal pivots and operated by a double-acting control jack 75. The flaps 74 and, if necessary, the frames 73 are of course made of a heat-resistant material.

Closure members can of course be provided on the nozzle spigots 51 so that only the curved ducts 14 and 15 are used, as in the aforesaid United States patent specification. The jacks 49 control the ground clearance of the auxiliary duct discharge orifices and the jacks 75 control the spread and range of each gas stream.

Using the ducts 54, 55 considerably increases the width which the gas streams can sweep effectively. With a turbo-jet of 2800–3000 kg. thrust weight, the width may be as much as 45 metres, or sufficient to thaw out in a single pass a width sufficient for the landing of a heavy aircraft. In this case the total width of the apparatus is some 14 metres, but with the ducts 54 and 55 folded the vehicle can be transported by rail without dismantling. The hot streams of gas issuing from the auxiliary ducts speed up at least some of the gases delivered by the curved ducts.

The scope of this invention will not of course be exceeded if equivalent means are used instead of the embodiments hereinbefore described; inter alia, instead of the mechanical deflecting systems in the duct orifices, a pneumatic system associated with two deflecting directions, of the kind described in the aforesaid United States patent specification, can be used, and the carrier vehicle can have a grid disposed in front of the curved ducts 14 and 15, as shown by chain lines 30a, to break up the snow and remove heavy parts, such as stones, which cannot be removed by blowing. Also, the support arms 58 and 59 can have the shape of a hollow triangular beam extending around a duct portion 54a and 55a. Such portion can have a sliding joint so as to vary the spacing of the discharge orifices of the auxiliary ducts 54 and 55. Each end portion can be borne by a wheel and not have a feeler-operated jack.

What is claimed is:

1. An apparatus for cleaning wide tracks covered in snow or glazed frost and comprising: a carrier vehicle, a turbo-jet arranged on said vehicle with its exhaust facing the vehicle front, the axis of said turbo-jet being substantially horizontal, a chamber connected to the exhaust of said turbo-jet for collecting the hot gases issuing therefrom, two curved discharge ducts connected to said chamber, the transverse discharge apertures of such ducts being near the ground and slightly staggered in the longitudinal direction which is the direction of vehicle movement, and at least one pair of straight auxiliary discharge ducts connected to said chamber and disposed in a substantially transverse direction and slightly behind the curved ducts.

2. Apparatus as set forth in claim 1 wherein the straight auxiliary ducts have near the chamber an articulation the axis of which is substantially vertical, to enable the auxiliary ducts to be bent rearwards on to the carrier vehicles sides.

3. Apparatus as set forth in claim 1 wherein the straight auxiliary ducts comprise a first portion connected to the chamber and a terminal portion articulated to the first portion, so that the discharge orifices of the auxiliary ducts can be maintained at a constant above-ground height.

4. Apparatus as set forth in claim 3 comprising drive means associated with the end portion to vary the relative orientation in a vertical plane of the end portion relatively to the first portion, and a feeler associated with the end portion to control the drive means.

5. Apparatus as set forth in claim 3 comprising a cradle in which the turbo-jet and the chamber are mounted, and an arm articulated to the cradle to support the first portion of each straight auxiliary duct.

6. Apparatus as set forth in claim 1 comprising a cradle for the turbo-jet and the chamber, the cradle being inclinable in a vertical plane around a horizontal transverse pivot disposed oppositely to the chamber, and drive means to vary cradle inclination.

7. Apparatus as set forth in claim 3 comprising a jaw-type support to receive the end portion of each auxiliary duct when the same is folded back along the vehicle side.

References Cited by the Examiner

UNITED STATES PATENTS

| | | | |
|---|---|---|---|
| 1,925,164 | 9/1933 | Woolery | 126—271.2 |
| 3,041,748 | 7/1962 | Wetzel. | |
| 3,199,506 | 8/1965 | Bertin et al. | 126—271.2 |
| 3,228,125 | 1/1966 | Wiebe. | |

FOREIGN PATENTS 1,191,114    4/1959    France.

CHARLES J. MYHRE, *Primary Examiner.*